Dec. 7, 1926.

J. J. CARTER ET AL 1,609,929

WINDING MACHINE

Filed April 7, 1923   5 Sheets-Sheet 4

Witnesses
Irvin A. Greenwald
Clarence Schmieding

Inventor
John J. Carter and
Arthur Miltner
By Frederick J. Hardman
their Attorney Dec. 7, 1926.  1,609,929
J. J. CARTER ET AL
WINDING MACHINE
Filed April 7, 1923   5 Sheets-Sheet 3
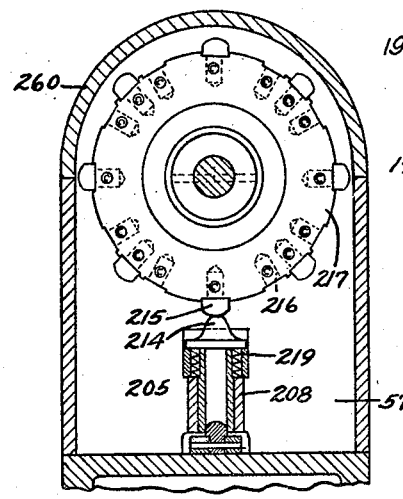
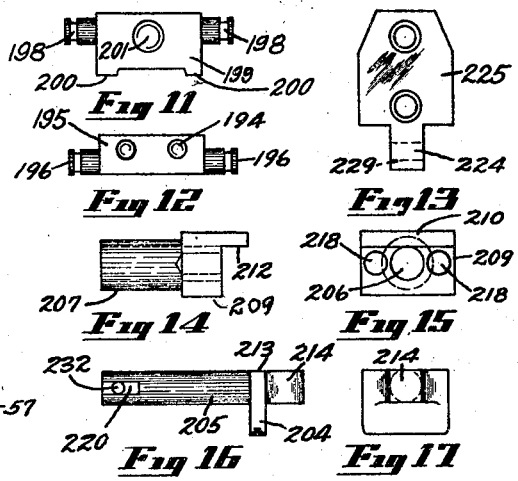
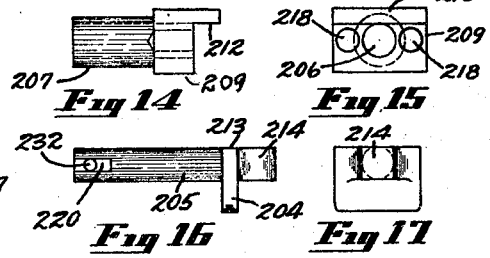
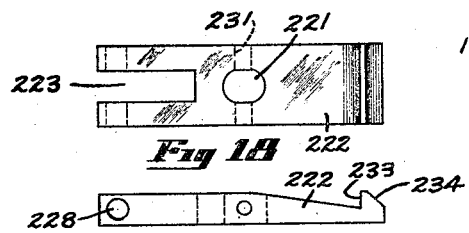
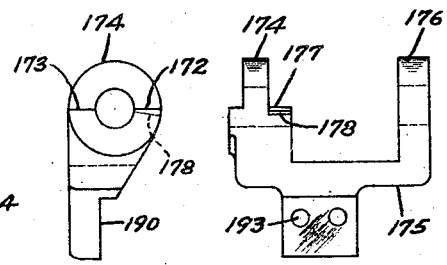
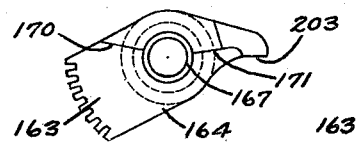
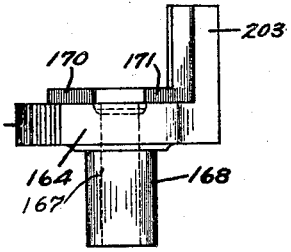

Patented Dec. 7, 1926.

1,609,929

UNITED STATES PATENT OFFICE.

JOHN J. CARTER AND ARTHUR MILTNER, OF ANDERSON, INDIANA, ASSIGNORS TO GENERAL MOTORS CORPORATION, OF ANDERSON, INDIANA, A CORPORATION OF DELAWARE.

WINDING MACHINE.

Application filed April 7, 1923. Serial No. 630,610.

This invention relates to wire winding machines employed in the construction of electrical apparatus, particularly for winding the armatures of dynamos and motors. It is among the objects of the invention to provide a machine in which the apparatus to be wound may be rotatably mounted to wind wire thereon in the most facile manner; to provide improved means for automatically stopping the rotation of the armature after a predetermined number of revolutions, said automatic means including provisions for varying the predetermined number of revolutions; and to provide manual as well as automatic means for starting and stopping the rotation of the armature.

Other and further objects and advantages of the present invention will be apparent from the following description, reference being had to the accompanying drawings, wherein a preferred embodiment of the invention is clearly disclosed.

Figure 2:
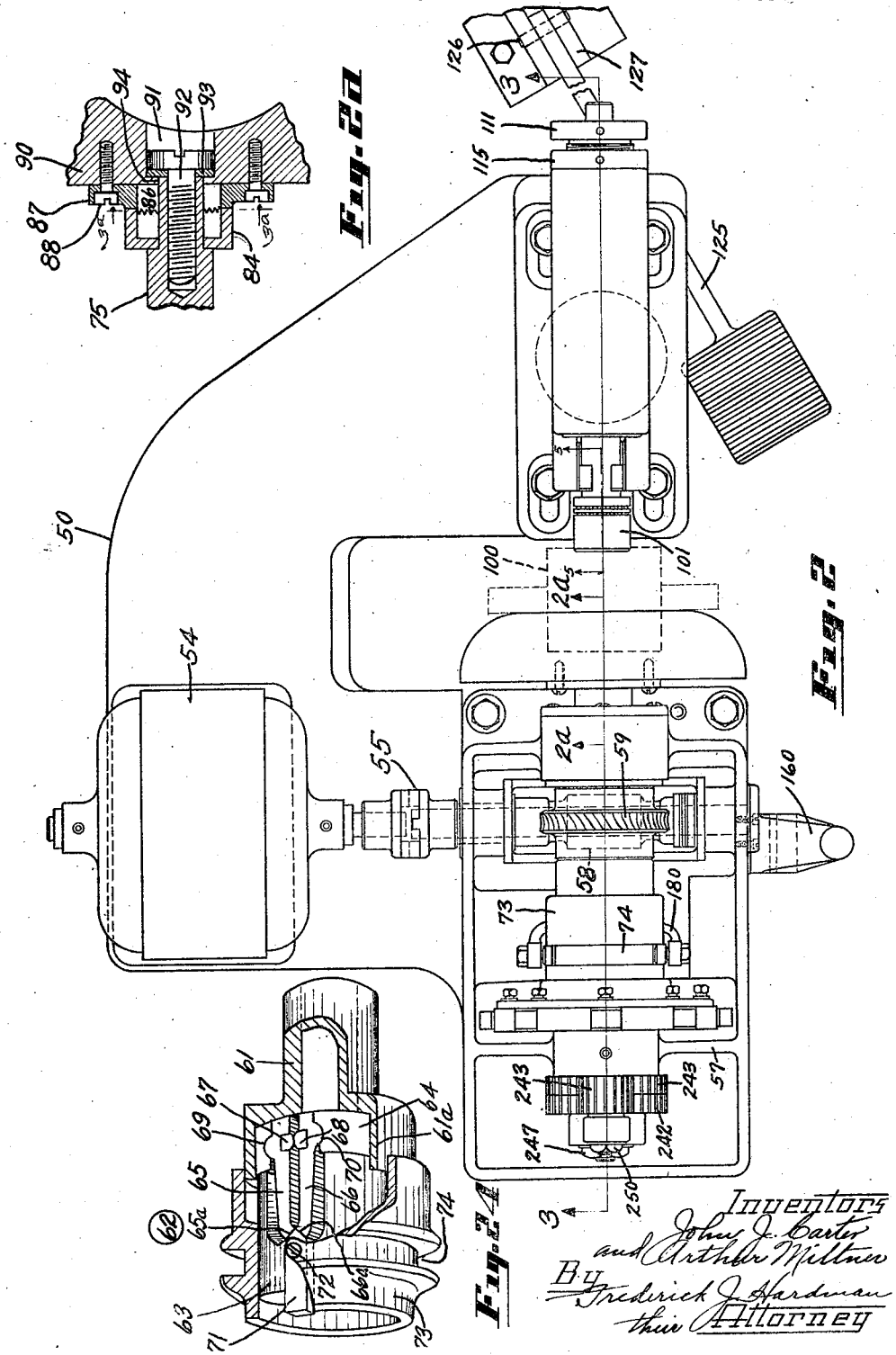
Fig. 2 is a plan view of the winding machine on a larger scale than Fig. 1, the cover of the gear housing being removed.

Fig. 2ª is a sectional view on an enlarged scale on the line 2ª—2ª of Fig. 2.

Figure 3:
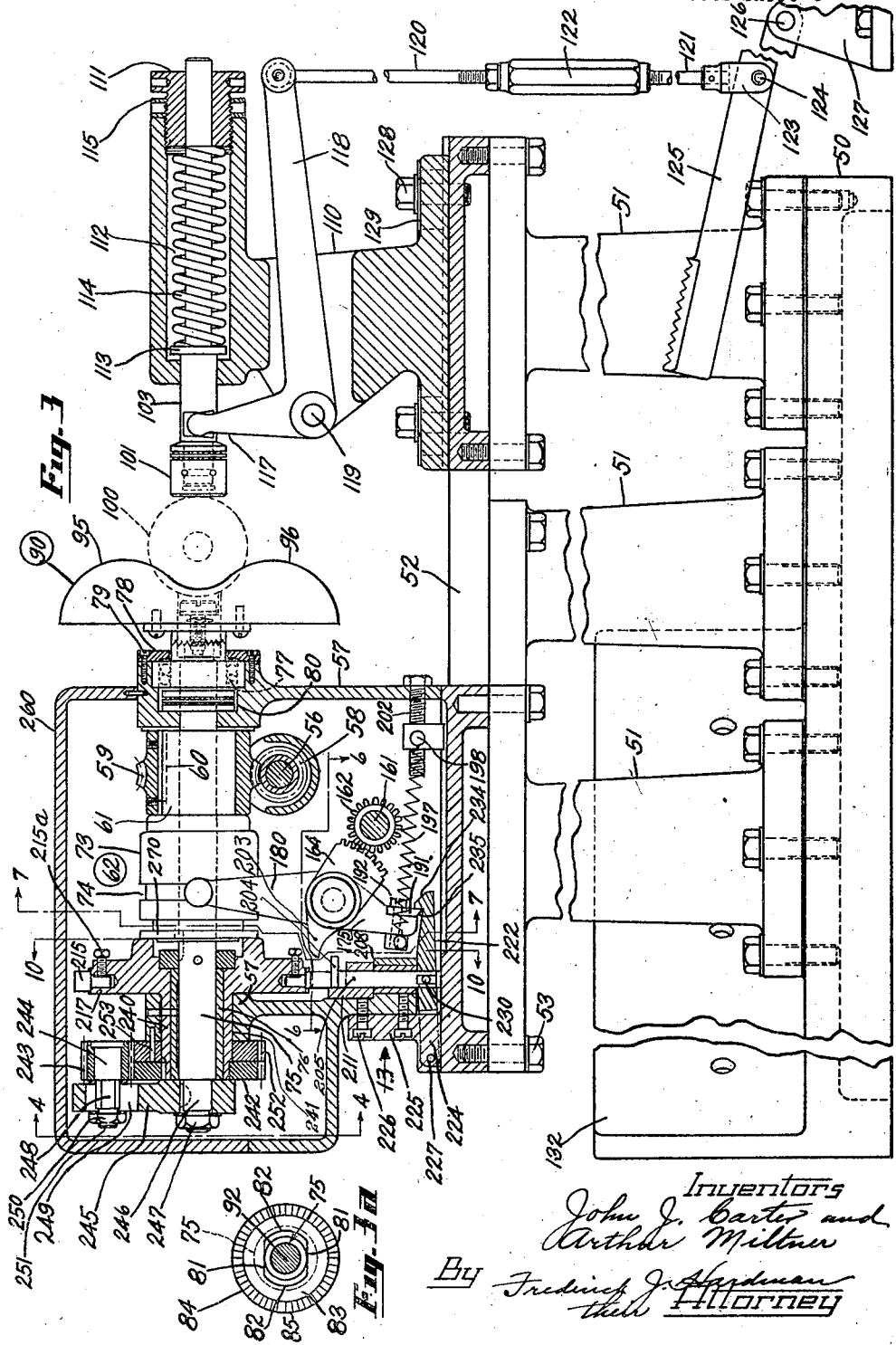

Fig. 3 is a sectional view on the line 3—3 of Fig. 2.

Fig. 3ª is an end view taken along the line 3ª—3ª of Fig. 2ª.

Figure 4:
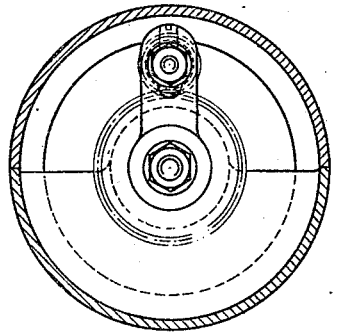

Fig. 4 is a sectional view on line 4—4 of Fig. 3.

Figure 5:
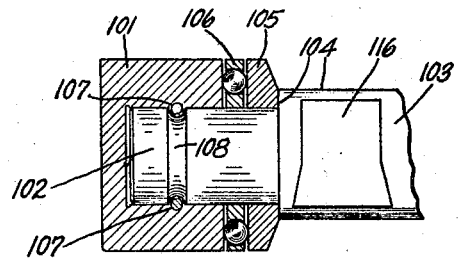

Fig. 5 is a sectional view on line 5—5 of Fig. 2.

Figure 6:
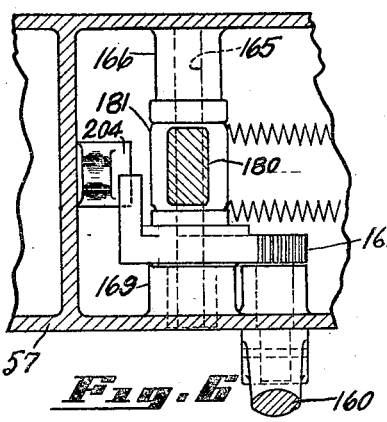

Fig. 6 is a sectional view on line 6—6 of Fig. 3.

Figure 7:
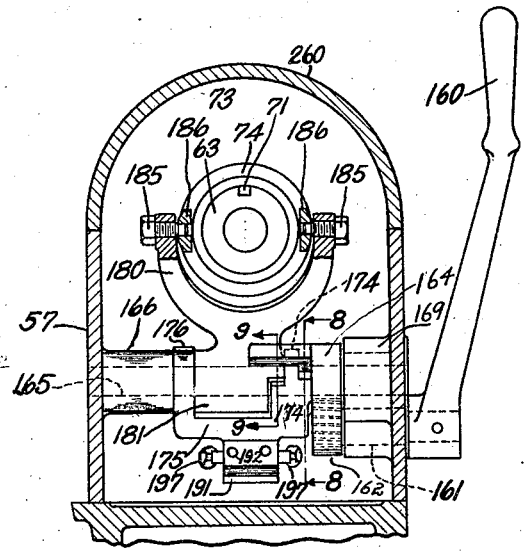

Fig. 7 is a sectional view on line 7—7 of Fig. 3.

Figure 8:
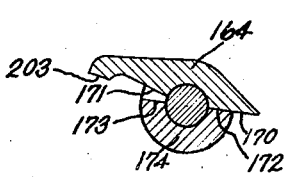

Fig. 8 is a sectional view on line 8—8 of Fig. 7.

Figure 9:
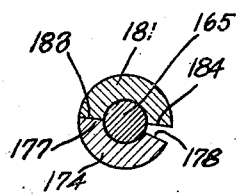

Fig. 9 is a sectional view on line 9—9 of Fig. 7.

Fig. 10 is a sectional view on line 10—10 of Fig. 3.

Figs. 11 and 12 are side views of spring stud blocks.

Fig. 13 is a view looking in the direction of the arrow 13 in Fig. 3 of a latch lever support.

Fig. 14 is a side view of a plunger sleeve.

Fig. 15 is a top plan view thereof.

Fig. 16 is a side view of the latch lever plunger.

Fig. 17 is a top plan view thereof.

Figs. 18 and 19 are plan and side views respectively of a latch lever.

Figs. 20 and 21 are end and side views respectively of the latch pawl lever.

Figs. 22 and 23 are end and side views respectively of a manual clutch release segment.

Fig. 24 is a perspective view of a clutch for connecting the power shaft with the winding head.

The winding machine includes a base 50 supporting three columns 51 upon which rests a table 52 attached to the columns by screws 53. An electric motor 54 drives through an Oldham coupling 55, a worm shaft 56, journalled in gear housing 57. Shaft 56 carries a worm 58 meshing with a worm wheel 59 attached by key 60 to the driving member 61 of a clutch 62, which includes a companion driven member 63, see Fig. 24, attached in any suitable manner to the winding spindle 75. Shaft 75 is supported by a plain bearing 76 and a ball bearing 77 retained by plate 78 and screw 79, both bearings being supported by the gear housing 57. Bearing 80 is a thrust bearing for taking up the thrust of the spiral gearing. Shaft 75 is provided with flats 81 and with a reduced cylindrical portion 82 adapted to be received by an aperture of corresponding shape provided in the end wall 83 of a cup member 84, the flange of which is provided with radiating notches 85. The notches 85 are adapted to cooperate with companion teeth 86 provided in the face of a collar 87 attached by screws 88 to the winding head 90. Head 90 is provided with a central aperture 91 for receiving the head of a screw 92 passing through a washer 93 and threaded into shaft 75. The washer bears against a shoulder 94 provided by the head 90. The cup 84 and the collar 87 cooperate with the screw 92 to provide an adjustable driving connection between shaft 75 and winding head 90.

The head 90 is of a type disclosed in the co-pending application of Albert B. Gomory, Serial No. 616,842 filed Feb. 3, 1923, and includes a cylindrical recess adapted to receive a portion of an armature core 100 and with cheeks 95 and 96 adapted to guide the wire into certain spaced slots of the core.

The core 100 is yieldingly maintained in position by means of a presser block 101 adapted to bear against the core 100, and loosely mounted on the reduced end 102 of a push rod 103. Rod 103 is provided with a shoulder 104 engaging with a washer 105. A thrust bearing 106 is located between the block 101 and washer 105. Block 101 is retained in position by means of pins 107 which extend loosely within a groove 108 provided in the reduced portion 102 of rod 103. Rod 103 is slidably supported by a bracket 110 and by a bushing 111 threaded into a cylindrical recess 112 provided in bracket 110. Rod 103 is provided with a shoulder 113 and a compression spring 114 located between shoulder 113 and bushing 111. The compression in spring 114 can be varied by turning the bushing 111 which can be secured in various positions of adjustment by means of a lock nut 115. Rod 103 is provided with oppositely disposed flattened portions 116 for receiving the yoke portion 117 of a lever 118 pivotally supported at 119 upon bracket 110. Lever 118 is connected by means of link members 120 and 121, a turnbuckle 122, clevis 123 and pin 124 with a pedal 125 pivoted at 126 on a bracket 127 located preferably adjacent the floor, upon which the base 50 is mounted. It is apparent that downward movement of the pedal 125 will cause the presser block 101 to be withdrawn from the armature core 100 to permit turning the core with respect to the head 90 or to permit removing the core from the winding machine.

Figure 1:
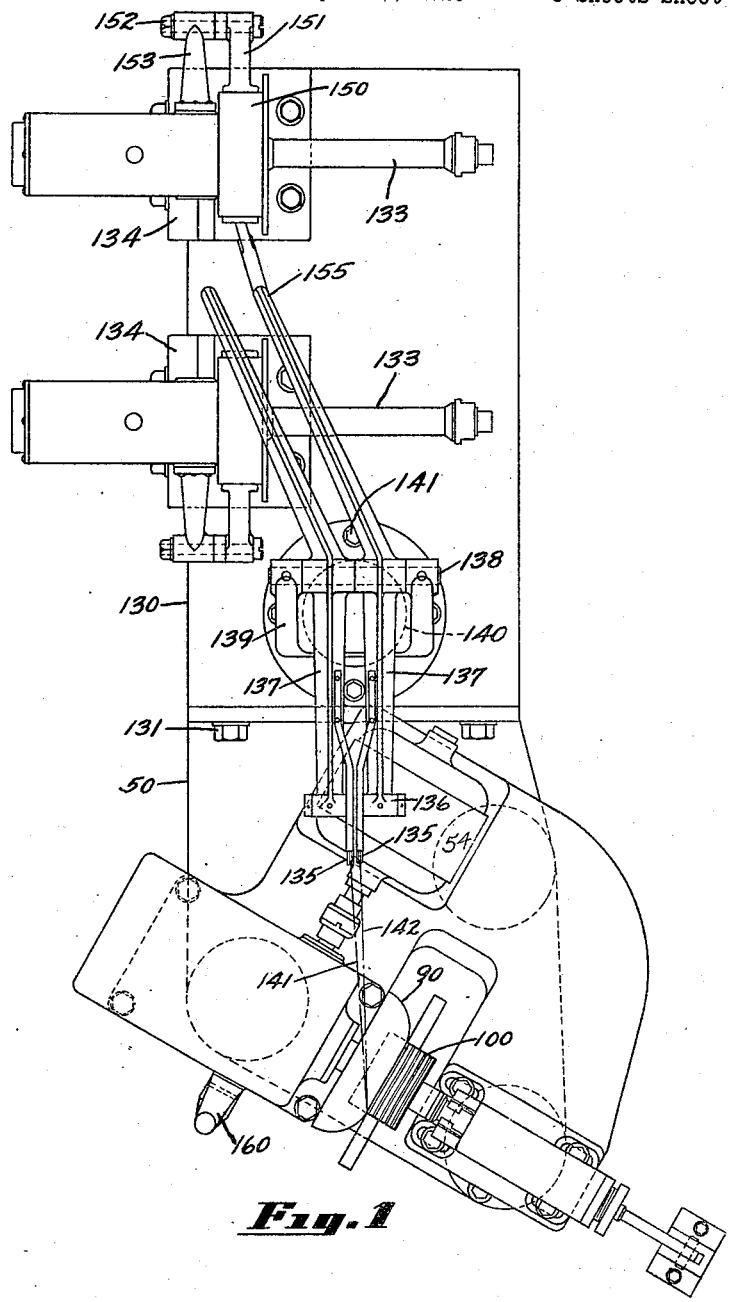
Fig. 1 is a plan view of the winding machine embodying the present invention and also a plan view of a wire tensioning device with which the present invention is adapted to cooperate.

The winding machine is adapted to cooperate with a wire unreeling and tensioning device disclosed in the co-pending application of Carter and Miltner, Serial No. 630,609 filed April 7, 1923, and including a base 130 attached by bolts 131 to a flange 132 provided by base 50, so that the unreeling device may be permanently located in proper relation to the winding machine. A plurality of horizontally extending spindles 133 are supported on posts 134 a substantial distance above the base 130 and each spindle is adapted to support a supply reel of wire. The wires from the supply reels pass around guide wheels 135 which are mounted at 136 on levers 137 which are pivotally mounted upon a pin 138 supported by a yoke 139 located at the upper end of a cylindrical post 140 attached by screws 141 to the base 130. The guide wheels 135 are located a substantial distance above the winding head and back of the winding head, as shown in Fig. 1. The planes of wheels 135 are oblique to the spindle 75. A plan view of the wires included between the core 100 and the wheels 135 are indicated by the dot and dash lines 141 and 142. It will be observed that rotation of the head 90 will cause the core 100 to be revolved about an axis perpendicular to the axis of its shaft and that the wires 141 and 142 will be guided onto the core by the operation of the cheeks 95 and 96. Since the core 100 provides a winding form which is rectangular in cross section, relative to the axis of shaft 75, the winding speed will not be uniform, but will suddenly accelerate and decelerate. In order to keep the tension of the wire uniform, the wire tensioning device includes means responsive to the acceleration of the winding speed for relieving a braking action normally retarding the rotation of spindles 133. This means is described and claimed in the application of Carter and Miltner referred to, and includes a brake drum 150 attached to spindle 133, a brake shoe 151 pivoted at 152 upon a bracket 153, attached to post 134, and includes devices connected with the brake shoe 151 and with the arm 155 of lever 137. These devices which are not shown includes a spring normally urging the brake shoes 151 toward the drum 150 and mechanism which operates in response to a jerk on a wheel 135 for gradually relieving the pressure of the spring.

Any suitable wire tensioning device could be used with the winding machine of the present invention. However, the winding machine and unreeling device illustrated are particularly adapted for cooperation by reason of the adaptation of the supporting bases of these machines to be attached together, and also because the location of the guide wheels 135 has been determined with respect to the location of the winding head 90. Wires 141 and 142 are brought from back of the face of head 90 down from the guide wheels 135 substantially straight to the core 100, as viewed in Fig. 1, and in vertical planes which are oblique to the axis of core 100. The cheeks 95 and 96 are constructed and located so as to cam the wires 141 and 142 in certain spaced slots of the core 100 during the rotation of spindle 75.

The bracket 110 is adjustable toward or away from the shaft 75 in order that the machine may be adapted for armature cores of various diameters. This adjustment is accomplished by the screws 128 passing through elongated holes 129 in bracket 110 and threaded into the table 52.

Automatic stop motion.

The rotation of shaft 75 is automatically stopped after a predetermined number of revolutions by mechanism which will now be described.

The clutch 62 which connects the motor 54 with the shaft 75 is preferably of the type of clutch known as the "Johnson," a trade name applied to a clutch known in the machine tool art. As shown in Fig. 24, the driven member 63 carries an expanding brake band 64 which is attached intermediate its ends by means of a screw not shown to the driven member 63. Member 63 carries toggle levers 65 and 66, provided with rocker blocks 67 and 68 respectively which provide fulcrums for the levers 65 and 66. The ends of brake band 64 are notched at 69 and 70 to receive portions of the levers 65 and 66. Levers 65 and 66 are provided with oblique camming surfaces 65ª and 66ª adapted to cooperate with corresponding surfaces on the point of a camming block 71 attached by screw 72 to a shifter sleeve or shell 73 provided with a groove 74. Shell 73 is endwise movable along the member 63 and rotates therewith. Movement of shell 73 to the right, as viewed in Figs. 3 and 24, will separate the surfaces 65ª and 66ª of levers 65 and 66 and cause the ends 69 and 70 of the brake band 64 to be spread apart to expand the band 64 against the brake drum 61ª carried by the driving member 61. Consequently motion is transmitted from the motor to shaft 75 through worm 58, driving work gear 59 mounted on clutch driving member 61 which is loose on shaft 75. Member 61 drives the brake band 64 attached to the driven member 63 which in turn drives the shaft 75.

The clutch is engaged manually by a mechanism including a hand lever 160 attached to a shaft 161 connected with a gear 162 meshing with teeth 163 provided on the manual clutch release segment 164. Segment 164 is loosely mounted on a rod 165 journalled within bearing 166 provided by gear housing 57 and within a bearing 167 provided in segment lever 164 which in turn is provided with a cylindrical hub 168 journalled within a bearing 169 provided by gear case 57. Lever 164 is provided with plane surfaces 170 and 171 substantially intersecting the axis of lever 164, one surface being oblique to the other. Surfaces 170 and 171 cooperate with surfaces 172 and 173 respectively provided by the hub 174 of a latch pawl lever 175 which includes hubs 174 and 176 loosely mounted on pin 165. The surfaces 172 and 173 intersect the axis of lever 175 and are in the same plane. The hub 174 is provided with a surface 177 in the same plane as surface 173 and with a surface 178 intersecting the axis of lever 175 but oblique to the plane 177. The clutch shifter yoke 180 is provided with a hub 181 having surfaces 183 and 184 adapted to cooperate with the surfaces 177 and 178 respectively of the hub 174 of lever 175, see Fig. 9. Hub 181 is journalled on rod 165 and the yoke 180 is provided with screws 185 supporting pivotally mounted shifter blocks 186 located in the groove 74 of the shifter sleeve 73.

Lever 175 is provided with a surface 190 to which is attached a latch pawl 191, see Figs. 3 and 7, by means of screws 192 which pass through holes in pawl 191, holes 193 in lever 175 and are threaded into tapped holes 194 provided in stud block 195 carrying spring studs 196, (see Fig. 12). Studs 196 are connected by springs 197 with studs 198 mounted on sliding spring stud block 199 provided with feet 200 for engaging a horizontal surface provided on the table 52. Block 199 is provided with a tapped hole 201 for receiving an adjusting screw 202 passing through the wall of gear housing 57. By turning the screw 202 the tension in springs 197 can be adjusted. The segment lever 164 is provided with a finger 203 adapted to strike against a shoulder 204 provided on plunger 205 which is slidable through the aperture 206 in sleeve 207 supported within a bracket 208 provided by the gear housing 57. Sleeve 207 is provided with a rectangular head 209 provided with a back surface 210 adapted to be received by a corresponding surface 211 provided by the housing 57, thereby preventing the sleeve from turning. The head 209 is provided with a front surface 212 for guiding a plain surface 213 provided on plunger 205 to prevent the plunger from turning. Plunger 205 is provided with a lug 214 adapted to cooperate with one or more stop pins 215 detachably secured within recesses 216 provided in stop disc 217. The head 209 of sleeve 207 is provided with apertures 218 for receiving springs 219 which are confined between the bracket 208 and the underside of shoulder 204. Therefore springs 219 urge the lug 214 toward the stop pin disc 217.

The lower end of plunger 205 is provided with flats 220 adapted to be positioned between the parallel sides of an elongated aperture 221 provided in a latch lever 222 which is notched at 223 to receive a projection 224 of bracket 225, secured by screws 226 to the gear housing 57. A pin 227 passes through holes 228 in lever 222 and through a hole in the projection 224 of bracket 225 in order to pivotally mount the lever 222 upon bracket 225. A pin 230 passes through holes 231 in lever 222 and through hole 232 in plunger 205 to pivotally attach the lever 222 to plunger 205. Lever 222 is provided with a notch 233 for receiving the pawl 191 and with a beveled surface 234 for camming the beveled surface 235 of pawl 191.

The stop pin disc 217 is provided with a hub 240 which supports the bearing 76 for the shaft 75 and hub 240 is journalled within a bearing 241 provided by housing 57. A gear 242 is keyed to the hub 240 and adapted to mesh with a planetary gear 243 mounted on a stub shaft 244 which is supported by arm 245 keyed to the reduced end 246 of shaft 75 and secured by means of a nut 247 threaded on shaft 75. The stub shaft 244 is provided with flats 248 adapted to be received within a slot 249 provided in arm 245.

A nut 250 cooperates with the threaded reduced end 251 of shaft 244 to secure shaft 244 in various positions of adjustment with respect to the shaft 75. Planetary gear 243 meshes with a stationary gear 252 secured to the gear housing 57 by means of a pin 253. Gears 242 and 252 have the same pitch diameter but gear 252 has one more tooth than gear 242, for example, gear 242 may have 48 teeth and gear 252, 49 teeth.

*Operation of the stop mechanism.*

To engage the clutch 72, the lever 160 is moved counterclockwise as viewed from the front of the machine, thereby causing the segment lever 164 to move clockwise as viewed in Fig. 3. Referring now to Figs. 8 and 9, lever 164 in moving clockwise will cause its surface 170 to engage the surface 172 of hub 174. Consequently the surface 177 of hub 174 will engage the surface 183 of hub 181, thereby causing the yoke 180 to move to the right as viewed in Fig. 3 to engage the clutch, by causing the pin 71 to separate the toggle levers 65 and 66, whereupon rotation of the shaft 75 will begin.

The lever 160 need not be retained manually to retain the clutch members in engagement. Movement of lever 175 clockwise causes surface 235 of latch pawl 191 to strike surface 234 of latch lever 222 and to cam lever 222 downwardly so that its notch 233 will receive the edge of pawl 191 to latch the yoke 180 in operative position.

Assume that gear 242 has 48 teeth and gear 252 has 49 teeth, for each rotation of shaft 75 the gear 242 will move 1/48th of a revolution, and, consequently, the stop pin plate 217. Assume that it is desirable to automatically stop rotation of the head after six revolutions. Then the disc 217 should come to rest after 6/48th or 1/8th of a revolution. Consequently the disc 217 is provided with eight equi-distant stop pins 215 secured by screws 215ᵃ. After an 1/8th revolution of disc 217, one of the pins 215 will strike the lug 214 and cause the plunger 205 to move downwardly into the position shown in Fig. 10. This motion of plunger 205 will cause lever 222 to release the latch pawl 191, whereupon the springs 197 will cause the latch pawl lever 175 to be rotated counterclockwise. The hub 174 will carry the surface 178 into contact with the surface 184 of hub 181, thereby causing the yoke 180 to be moved to the left in Fig. 3 to shift the sleeve 73 to the left and to retract the pin 71 from the levers 65 and 66. It will be noted that the hubs 174 must travel a substantial distance before striking the surface 184, therefore due to the action of the springs 197, the lever 175 acquires a substantial momentum causing the surface 178 to engage the surface 184 with a substantial impact or hammer blow to move the shifter sleeve 73 to the left in a positive and rapid manner, so that the clutch may be quickly disengaged. If the clutch shell 73 were not rapidly shifted there would be slippage between the brake band and drum, causing the friction surfaces to wear out quickly.

When the springs 197 are released, the lever 175 will cause surface 172 to engage surface 170 of lever 164 causing lever 164 to move counterclockwise and the gear 162 and shaft 161 and lever 160 to be rotated clockwise into non-operating position.

During the six revolutions of shaft 75, six turns of a coil of wire will have been applied to the armature core 100. Then the core 100 is relocated with respect to the head 95 by retracting the pressure block 101 and then allowing the block to return to engage the core 100 and retain it in its new position. Then the clutch 62 can be reengaged by movement of the lever 160 in a counterclockwise direction.

At any time during the rotation of shaft 75, the clutch 62 can be disengaged manually by rotating the lever 160 clockwise. Such movement of lever 160 will cause the segment lever 164 to be moved counterclockwise, whereupon the finger 203 will engage the shoulder 204 to move the plunger 205 downwardly, and therefore cause the clutch to be released in the same manner as described in connection with the automatic actuation of the plunger 205.

The gear housing 57 is provided with a cover 260 to provide ready access to the gearing in order to facilitate relocating the pins 215 and changing the gears 242 and 252 and relocating the planetary gear 243. By removing arm 245, gears 242 and 252 can be removed and be replaced by another pair of gears having the same pitch diameter, and having teeth shaped so as to mesh with planetary gear 243 and which differ in number of teeth by one. The following table shows the numbers of teeth for the pairs of gears 242 and 252, the number of stop pins in disc 217 and the corresponding numbers of turns of shaft 75 before it will be stopped automatically:

| Gear 242 | Gear 252 | Number of pins | Number of revolutions |
|---|---|---|---|
| 44 | 45 | 4 | 11 |
| 48 | 49 | 4 | 12 |
| 48 | 49 | 6 | 8 |
| 48 | 49 | 8 | 6 |
| 48 | 49 | 12 | 4 |
| 54 | 55 | 6 | 9 |
| 56 | 57 | 4 | 14 |
| 56 | 57 | 8 | 7 |
| 60 | 61 | 4 | 15 |
| 60 | 61 | 6 | 10 |
| 60 | 61 | 12 | 5 |

Therefore, with four sets of gears and a set of twelve stop pins, the machine can be adapted to stop automatically after 4, 5, 6, 7, 8, 9, 10, 11, 12, 14 and 15 revolutions. It will be apparent from the foregoing how other combinations of gears and stops may be produced for obtaining automatic stopping after predetermined numbers of revolutions other than those mentioned.

It is desirable that the armature 100 be brought to rest each time in substantially the same position relative to the machine. Therefore a brake is employed to reduce the over travel of the shaft 75 after the clutch has been disengaged. When the latch lever 222 is released, the springs 197 will cause the shell 73 of clutch 62 to move to the left in the manner described, to cause the end of shell 73 to engage a friction member 270 located between shell 73 and the face of disc 217. Since the disc 217 is rotating much slower than the shaft 75, because of the gearing described, a braking action will be applied to the shell 73 to bring the shaft 75 quickly to rest after the clutch has been disengaged. The stopping of the shaft 75 is also assisted by the tension on the wires 141 and 142.

While the form of mechanism herein shown and described constitutes a preferred form of embodiment of the invention, it is to be understood that other forms might be adopted, all coming within the scope of the claims which follow.

What we claim is as follows:

1. In a winding machine, the combination with a spindle and power means for rotating the spindle; of manually controlled means for causing the spindle to rotate; means for automatically locking said manually controlled means in spindle-operating position; automatic means for rendering the locking means inoperative after a predetermined number of revolutions of the spindle; a spring for moving the manually controlled means into spindle-stopping position; and other manually controlled means for rendering the locking means inoperative, independently of the automatic means, whereby the spring will stop rotation of the spindle.

2. A winding machine comprising, in combination, a driving element, a spindle to be driven, and a clutch interposed therebetween, manually controlled means for operating the clutch to connect the driving element and spindle; a latch for locking the manually controlled means in clutch-operating position; automatic means for unlatching the manually controlled means after the spindle has rotated a predetermined number of revolutions, and a spring for quickly moving the manually controlled means to clutch-disengaging position when said manually controlled means is unlatched.

3. A winding machine comprising, in combination, a driving element, a spindle to be driven, and a clutch interposed therebetween, manually controlled means for operating the clutch to connect the driving element and spindle; a latch for locking the manually controlled means in clutch-operating position; automatic means for unlatching the manually controlled means after the spindle has rotated a predetermined number of revolutions; a spring for quickly moving the manually controlled means to clutch-disengaging position when said manually controlled means is unlatched; and means manually operable for disengaging the clutch independently of the automatic means.

4. In a winding macine, the combination with a spindle and power means for rotating the spindle; of a clutch for connecting the power means with the spindle; and clutch disengaging apparatus including spaced portions and means for causing one of said portions to move a substantial distance and then strike the other portion whereby the clutch will be quickly disengaged by the impact of said portions, said apparatus including means for varying the force of the impact of one of said portions upon the other.

5. In a winding machine, the combination with a spindle and power means for rotating the spindle; of a clutch for connecting the power means with the spindle; clutch disengaging apparatus including a shaft and spaced portions rotatably mounted on said shaft; and means adapted to permit one of said portions to rotate relatively to the other for a substantial distance and then strike the other portion whereby the clutch will be suddenly disengaged by the impact of said portions.

6. In a winding machine, the combination with a spindle and power means for rotating the spindle; of a clutch for connecting the power means with the spindle; apparatus for automatically disengaging the clutch after a predetermined number of revolutions, said apparatus including a shaft and motion-transmitting elements rotatably mounted thereon, one element being initially rotatable relative to the other for a substantial distance and including means for striking the other element and rotating it therewith whereby the clutch will be suddenly dsiengaged to stop rotation of the spindle.

7. In a winding machine, the combination with a spindle and power means for rotating the spindle; of a clutch for connecting the power means with the spindle; latching means for automatically locking the clutch in connecting position; automatic means for disengaging the latching means after the spindle has made a predetermined number of revolutions; and means for varying the time of operation of the automatic disengaging means to vary the number of revolutions of the spindle before disengagement of the latching means.

8. In a winding machine, the combination with a spindle and power means for rotating the spindle; of a clutch for connecting the power means with a spindle; latching means for automatically locking the clutch in connecting position; automatic means for disengaging the latching means after the spindle has made a predetermined number of revolutions; adjustable means driven by the spindle for operating the disengaging means, said adjustable means being adapted to vary the operation of the disengaging means relative to the spindle for varying the number of revolutions of said spindle before disengagement of the latching means.

9. In a winding machine, the combination with a spindle and power means for rotating the spindle; of a clutch for connecting the power means with the spindle; latching means for automatically locking the clutch in connecting position; automatic disengaging means rotatably supported on the spindle for releasing the latching means; driving means interposed between the spindle and the disengaging means and adapted to operate the disengaging means to release the latching means after a predetermined number of spindle revolutions; and means for changing the driving means whereby the spindle will be rotated another predetermined number of revolutions before the disengaging means releases the latch to disconnect the spindle from its power means.

10. In a winding machine, the combination with a spindle and power means for rotating the spindle; of a clutch for connecting the power means with the spindle; latching means for automatically locking the clutch in connecting position; automatic disengaging means rotatably supported on the spindle for releasing the latching means; differential gearing connecting the spindle and the disengaging means and adapted to operate the latter to cause releasing of the latch after a predetermined number of revolutions of the spindle; and means for changing the differential gear connection to vary the driving ratio between the spindle and the disengaging means whereby the spindle will rotate a different number of revolutions before the disengaging means becomes effective to release the latching means.

In testimony whereof we hereto affix our signatures.

JOHN J. CARTER.
ARTHUR MILTNER.